April 17, 1962 S. KAGAN 3,029,808
DIRECT CURRENT MEDICAL AMPLIFIER
Filed July 30, 1957
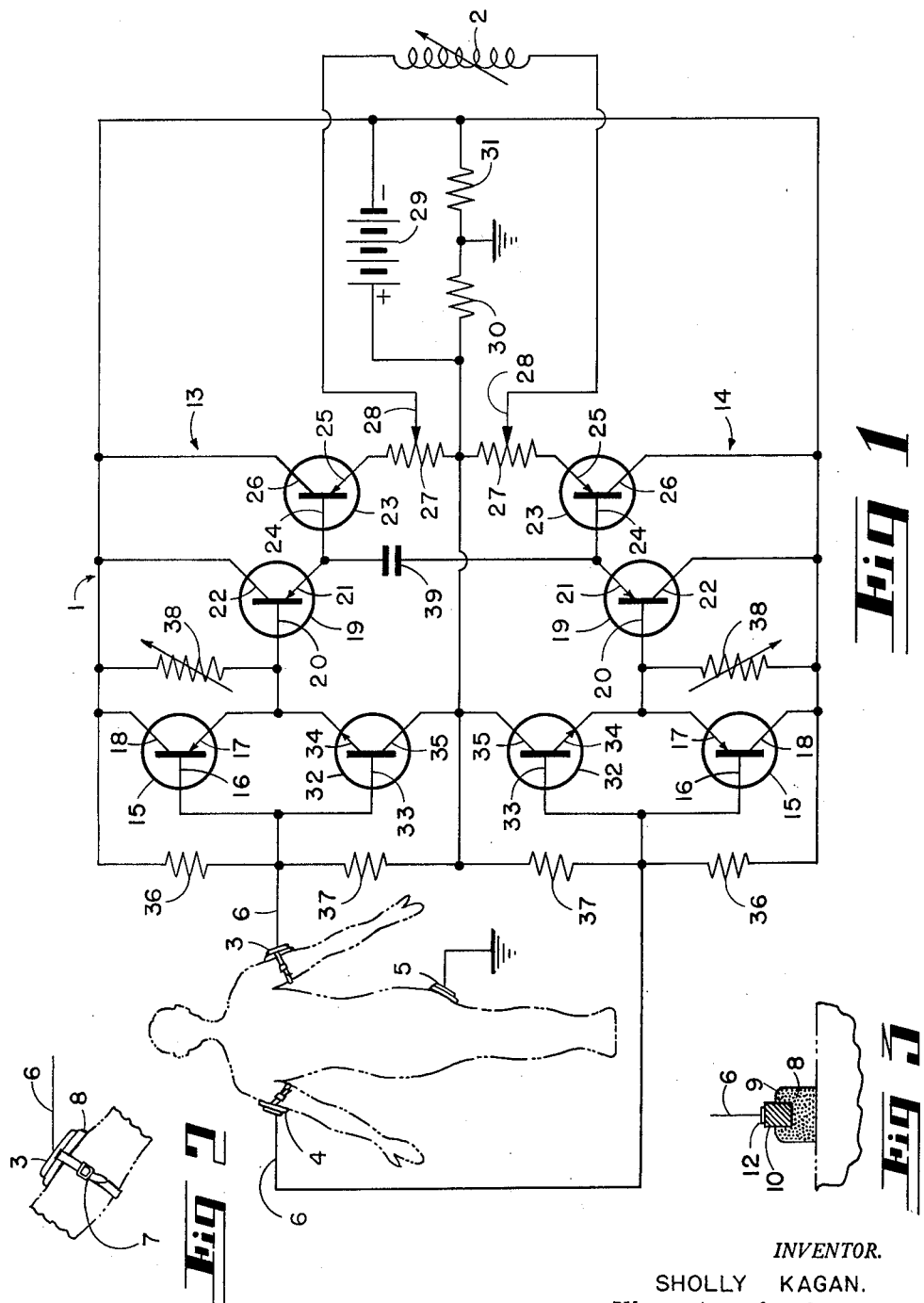
INVENTOR.
SHOLLY KAGAN.
BY Alden D. Redfield
Irwin P. Garfinkle
ATTORNEYS.

United States Patent Office 3,029,808
Patented Apr. 17, 1962

3,029,808
DIRECT CURRENT MEDICAL AMPLIFIER
Sholly Kagan, Newton Highlands, Mass., assignor to Arco Manufacturing Corporation, Cincinnati, Ohio, a corporation of Delaware
Filed July 30, 1957, Ser. No. 675,140
7 Claims. (Cl. 128—2.06)

This invention relates to direct current amplifiers designed for use in measuring characteristics of living animal bodies and, more particularly, to a transistorized direct current amplifier designed for measuring voltages generated by the human heart and muscles under variable conditions.

Resulting from recent investigation into the new sciences of space and supersonic speeds, medical science has been called upon to investigate the effects on the human body of such conditions as extreme temperatures, speed, acceleration, etc. To accomplish this, use has been made of the phenomenon that the heart and muscles of a living animal body are, in fact, generators of very small voltages. If the generated voltages are precisely and accurately measured, the electrical values can be translated into biological and physiological characteristics. It has been found that the voltages developed by the human heart, for example, can be measured by connecting a meter across the body at three points, such as a terminal at the left arm and a terminal at the right arm, with a ground at the left leg. The voltage levels encountered are of the order of 1 millivolt, peak to peak, and while many of the portions of the voltage curve can be measured by the presently used A.C. couplings, it has been found that the variations in certain portions of the curve are of such a nature that D.C. couplings are required from source to load in order that more complete information may be derived as to the condition of the heart and/or muscles.

The amplifier provided in accordance with this invention must be very small so that it may be mounted on a man under test; it must be durable enough to withstand shock, centrifugal action, acceleration, etc.; it must be relatively insensitive to extreme variations in temperature and humidity to which a man or animal may be subjected; it must be sensitive to low level D.C. signals; it must have a high input impedance and a low output impedance. It has been found that a transistor amplifier constructed in accordance with my invention will accomplish each of the required results.

The character of the human or animal body is such that very serious difficulties arise when measurements are made with a transistorized D.C. amplifier. In most cases, the amplifier is coupled to the body by means of strap-on type electrodes, and the usual prior art type of electrode shows a substantial contact resistance in the order of 2,000 to 20,000 ohms. As the muscles of a man or animal under test are moved, the contact resistance between the body and the electrode varies. With the arrangements used in the prior art, the forward biasing current for the input transistors flows through the variable contact resistance, and voltage variations are produced which tend to swamp out the desired signals.

Another aggravating factor is that a fluid consisting of a saline solution must be used to reduce the contact resistance to the above values. This produces a situation in which there are two dissimilar materials, a metal (the electrode) and a hydrocarbon (the body skin), with an electrolyte (the saline solution) between them. Actual measurements have shown that this combination has all the properties of a battery, and D.C. potentials on the order of ½ volt have been measured. Even when a balanced type of amplifier connection is used, fairly high differential voltages are found to exist because of very slight dissimilarities between the balanced branches and because of a tendency towards polarization.

It is, therefore, an object of this invention to provide a transistorized D.C. amplifier which is small in size, insensitive to temperature, and rugged enough to withstand shock, acceleration, etc.

It is another object of this invention to provide a D.C. amplifier which will be insensitive to variations in the impedance of the source.

Another object is to produce a D.C. amplifier suitable for use in measuring the voltages generated by the human or animal heart and muscles, and which will automatically be insensitive to variations in contact resistance between the skin and electrode, and which will also be insensitive to temperature variations.

Another object of this invention is to produce a high impedance transistor amplifier and at the same time shunt the forward biasing currents from the source.

Still another object of the invention is to provide apparatus for making a low resistance electrical contact between an electrode and human or animal skin.

A still further object is to provide a skin-to-electrode contact which will have low resistance and which will not generate D.C. voltages.

A more complete understanding of the nature and objects of this invention may be had by a consideration of the following detailed description and the accompanying drawings, in which:

FIG. 1 is a schematic diagram showing a preferred arrangement of my amplifier connected for measuring the responses of the human body;

FIG. 2 represents a preferred form of the electrode arrangement used in accordance with my invention; and FIG. 3 represents another preferred form of electrode.

FIG. 1 illustrates a human body to which my balanced D.C. amplifier 1 and a conventional string-type galvanometer 2 have been connected by means of strap-on electrodes 3, 4 and 5. While other connections may be used, it has been found that the most satisfactory indications are derived when the electrodes 3, 4 and 5 are connected, respectively, to the left arm, the right arm and the left leg, which is grounded. The electrodes 3 and 4 are connected by means of leads 6 to the input circuit of the amplifier 1 where the signals are amplified and then applied to the galvanometer 2 to derive absolute D.C. voltage values.

As was previously explained, the contact resistance between the skin of a human body and the electrodes 3, 4 and 5 is very high and must be reduced by a considerable amount. One obvious way to reduce the contact resistance would be to use metal electrodes in the form of needles which would pierce at least the outer skin layers. However, it has been found that the psychological effect of the use of needle-type electrodes reduces the very limited numbers of human volunteers for tests of this nature.

As an alternative to the use of direct contacts by means of metal needles, the strap-on electrode such as that illustrated in FIG. 2 has been used. In the past, this type of electrode generally has been made of silver or other good conducting material. In order to reduce the amount of contact resistance between the silver electrode and the skin, a saline solution in the form of a liquid paste has been applied between the skin and the electrode. The saline solution tends to penetrate the pores of the skin, and thus has an effect similar to that of the needle-type electrode. However, although this method does reduce contact resistance, it also has the adverse effect of producing a D.C. battery and, as previously explained, potentials on the order of ½ volt have been measured. Since the voltages developed by the heart and muscles are on the order of only a millivolt, any variation in the voltage will swamp out the small D.C. voltages sought to be determined.

The battery problem has been solved by means of an improved electrode which constitutes one phase of my invention. The strap-on electrode 3 illustrated in FIG. 2 is constructed in the usual configuration—i.e., it is shaped and sized to be secured to an arm or leg by means of straps 7. As in the usual manner, a saline solution 8 in the form of a paste is applied between the electrode 3 and the skin; however, I avoid D.C. battery action by the use of an electrode which is made of a conducting rubber material. A satisfactory electrode may be composed primarily of a methyl phenyl polysiloxane gum with a filler of carbon black. The composition may comprise 15 to 40 parts of carbon black materials of the type known under the trade names of Shawinigan Black (100% compression), Vulcan SC or Statex R, plus a vulcanizer of dicumyl peroxide added to the gum. It is to be understood that although silicone rubber is preferred, since natural rubber tends to deteriorate, natural rubber with a carbon filler may also be used, and this invention is not to be limited to silicones. It is also to be understood that the surface conductivity of the electrode will vary between wide limits, depending on the amount of carbon used in proportion to rubber, and on the manufacturing processes used.

It is noted that the materials which comprise a conducting silicone or natural rubber electrode are comprised of materials very similar in chemical structure to human or animal skin; that is, the conducting rubber electrodes are essentially hydrocarbons, as is the skin. Since a battery effect can only be produced by dissimilar materials, D.C. voltages are minimized and the battery effect is almost completely avoided.

FIG. 3 illustrates another embodiment in which the principles of this invention are employed. In FIG. 3 there is shown an electrode 9 composed of a porous, absorbent, non-conducting material such as plaster. The electrode is made conductive by soaking in a saline solution. A solid carbon body 10 is imbedded in the plaster, and the lead 6 is connected to the carbon for interconnecting the electrode with the measuring instruments. Since the chemical structure of carbon is also close to the chemical structure of hydrocarbon, the battery effect is avoided. However, carbon is also somewhat porous, and there is a tendency for the saline solution to be absorbed. If the saline solution 8 should contact the metal lead 6, then the benefit of the use of the carbon would be lost. I avoid this possibility by painting a thin layer of oil 12 at the top of the carbon to prevent absorption of the saline solution in the proximity of the lead 11.

While electrodes made in accordance with my invention substantially avoid the battery effect, there still remains a contact resistance of from 2,000 to 20,000 ohms. As previously noted, this resistance varies as muscles are flexed, etc., and currents from the amplifier which flow through it will generate very undesirable voltages. This problem is most acute with transistors since transistors are current-operated devices, i.e., it is necessary to pass a forward current through the base in order to bias a transistor into an operating region and, moreover, all transistors have a certain saturation current flowing through them. If, for example, a transistor is employed in which a base current of only 10 microamperes is required then, with a contact resistance of 2,000 ohms, 20 millivolts D.C. will be developed across the source; with a contact resistance of 20,000 ohms, 200 millivolts D.C. will be developed across the source. Either of these voltages is substantially greater than the generated signals, and any variation in contact resistance will produce voltage variations across the source which will effectively swamp the signal out.

The undesirable currents could be shunted from the contact resistance by using a low impedance input circuit to the amplifier; however, the original signals are extremely low and, therefore, sensitivity can in no way be sacrificed. For this reason, a high impedance input must be used. By means of my invention I provide the necessary high impedance and at the same time the amplifier is arranged so that the forward biasing currents in the first stage do not flow through the input circuit to the transistor.

The amplifier 1 comprises two identical sections 13 and 14 connected for balanced operation. Since the sections are identical, corresponding parts are identified in the drawing by the same reference characters to avoid duplication. Each section 13 and 14 employs three transistor stages, each stage being connected for common collector operation, i.e., the input circuit to each stage is between the base and collector electrodes, and the output circuit is connected between the emitter and collector electrodes. The signal from the electrodes is applied across the base-collector diode of the first transistor stages which comprise the transistors 15, each having a base 16, an emitter 17 and a collector 18. The outputs from the first stages are taken from the emitters 17 and directly applied to the input circuits of the second stage transistors 19 which each have a base 20, an emitter 21 and a collector 22. The second stage outputs may then be taken from the emitters 21 and applied to the input circuit of the third stage transistors, each comprising a base 24, an emitter 25 and a collector 26.

It is noted that the three stages in both sections have been connected in an emitter-follower cascaded configuration. This has been done for the purpose of achieving the necessary impedance transformation between the high impedance input and the low impedance galvanometer. This arrangement also provides the required power gain. It is also noted that the three stages shown employ PNP-type transistors; however, it is to be understood that NPN-type transistors may also be used by means of such appropriate alterations in circuitry as are well known in the prior art.

The emitter circuit of each transistor 23 is provided with an output resistor 27. Since transistors are current-operated semi-conductors, potentials exist between the various elements. These potentials cannot be precisely controlled under all circumstances and, therefore, when the amplifier sections 13 and 14 are perfectly balanced, there may still be a potential difference in the output circuit. For this reason, the resistors 27 are provided with movable taps 28 from which the output of each of the sections 13 and 14 is then coupled to the galvanometer 2. In this way, with no signal present at the input of either section, the combined output of sections 13 and 14 will be cancelled. Both sections are operatively powered by means of a battery 29 connected across biasing resistors 30 and 31.

Because of the fact that there is a current flowing in the base 16 of the first stage transistors 15, a variable voltage will be produced in the base circuits if the base current flows through the variable resistance between the strap-on electrodes and the skin. Unless means are provided for shunting this current, the voltage produced will be amplified through each transistor, and this variable voltage will completely swamp out the desired D.C. signals. By means of my invention I produce a D.C. shunt across the body to by-pass the undesirable currents, but at the same time I maintain the input impedance of the amplifier at a very high value as required. This is accomplished by means of the transistors 32.

Each transistor 32 comprises a base 33, an emitter 34 and a collector 35 connected for common collector operation and arranged in complementary symmetry with the transistors 15; i.e., when the transistors 15 are of the PNP-type as illustrated, then the transistors 32 will be of the NPN-type and the emitters 17 and 34 will be interconnected, as will the bases 16 and 33. With the transistors 15 and 32 so connected, currents in the various elements of each transistor will flow in opposite directions. In other words, if we assume that current flowing into the base 16 of the transistor 15 is in the positive direction, then a negative current is flowing into the base 33 of the transistor 32.

If transistors 15 and 32 are chosen so that their betas, that is their amplifying characteristics are approximately of the same order of magnitude, then the base current of one will flow through the base of the other, rather than through the contact resistance. In practice, this situation is improved to some extent by establishing a reference point by means of high impedance resistors 36 and 37 connected across the input circuit of the transistors 15 and 32 and, in addition, by means of variable balancing resistors 38 which are inserted between the collectors 18 and emitters 17 of each transistor 15 to compensate for any possible unbalance in the output of transistors 15 and 32. A condenser 39 may be connected between the emitters 21 of each section 13 and 14 to by-pass high frequency noise, etc., and thereby limit the frequency of the signals applied to the galvanometer 2.

The problem of drift due to variation in temperature is eliminated by mounting both sections 13 and 14 of the amplifier 1 in an aluminum container. Since the temperature characteristics of all the transistors are very nearly the same, the effect of temperature variations on each transistor will be approximately equal, and thus the variations on both sections 13 and 14 of the amplifier will be equal and opposite, and will cancel.

In summary, applicant is able to use an amplifier system which is direct current coupled throughout for very accurately measuring the direct currents generated by an animal body. These results are achieved by: (1) the use of a bridge-type circuit as the input for the electrodes; that is to say, the electrodes 3 and 5 are connected in a bridge circuit which includes the resistors 36 and 37 (in the upper section 13 of the amplifier) and the resistors 30 and 31, and the electrodes 4 and 5 are connected in a bridge which includes the resistors 36 and 37 (in the lower section 14 of the amplifier) and the resistors 30 and 31; (2) the use of the transistor 32 connected in complementary symmetry with the transistor 15 in each section; and (3) the use of special electrodes. The bridge-type circuits eliminate currents from the body which would otherwise flow through the body from the battery; the transistor 32 eliminates currents from the body which would otherwise flow from the base 16 of transistor 15 through the body; and the special electrodes eliminate currents otherwise generated in the electrodes. The elimination of these currents permits accurate direct-current measurements.

In a successful working embodiment of this invention, 2N135 type transistors were employed in transistor stages 15, 19 and 23 while 2N78 type transistors were employed as the transistors 32. The battery 29 was 6 volts, while each of the resistors 30 and 31 was 1,000 ohms. The high impedance input resistors were each 1 megohm. It is to be understood, however, that the above circuit values are merely illustrative of one successful design and that I do not intend that my invention be limited in any manner to the above parameters.

Having thus described my invention, what I claim is:

1. In a body voltage detection system for detecting the direct current voltages developed by a living animal body, the combination comprising: first and second electrodes connected to first and second points on said body, said first point being connected to a point of reference potential; a source of direct current potential; first and second series-connected resistors of substantially equal impedance connected across said source, the junction of said first and second resistors being connected to said point of reference potential; third and fourth series-connected resistors of substantially equal impedance connected across said source, the junction of said third and fourth resistors being connected to said second electrode whereby said first and second electrodes are effectively connected into a balanced direct current bridge and currents from said source do not flow through said first and second contacts; a direct current amplifier for amplifying the varying voltages developed across said first and second electrodes by said living animal body, said amplifier comprising a first transistor of one conductivity and a second transistor of opposite conductivity, said transistors each having a base, an emitter, and a collector and being connected for common collector operation, the base and collector of one of said transistors being connected across said third resistor, and the base and collector of the other of said transistors being connected across said fourth resistor, said emitters being interconnected, whereby currents from each base flow into the other base; and an output circuit connected between one of said collectors and the junction of said emitters.

2. In a body voltage detection system for detecting direct voltages generated by a living animal body, said system including body electrodes and a direct current amplifier and being free from electrode-generated potentials and from varying effects of body impedance, the combination comprising first and second electrodes for contacting separated points on said body, a saline solution interposed between each of said electrodes and said body for reducing the impedance of the contact between said electrodes and said body, said electrodes being composed of a material having a position on the electrochemical scale close to that of the skin of said body, thereby minimizing the tendency to produce galvanic action between said electrode and said body, said direct current amplifier including a first transistor of one conductivity having base, emitter, and collector electrodes, said base and collector electrodes being direct current connected across said body between said two body electrodes, and means for shunting direct currents flowing in said base electrode from said body, said means including a second transistor of opposite conductivity having base, emitter, and collector electrodes, said bases being interconnected and said emitters being interconnected, and a source of energizing direct current potential connected between said collectors.

3. The invention as defined in claim 2, wherein said first and second electrodes are composed of a non-conducting carbon material filled with a conducting hydrocarbon material.

4. The invention as defined in claim 2 wherein are provided first, second, third, and fourth resistors connected as a balanced Wheatstone bridge having input terminals and output terminals, said source of energizing direct current potential being connected across said input terminals and said first and second electrodes being connected across said output terminals whereby direct currents flowing from said source do not flow through said body.

5. In a body voltage detection system for detecting direct voltages generated by a living animal body, the combination comprising: first and second body electrodes connected to first and second points on said body, said body electrodes being composed of a material having a position on the electrochemical scale close to that of the skin of said body, thereby minimizing the tendency to produce galvanic action between said electrode and said body; a balanced four-terminal resistance bridge; a direct current source having first and second terminals connected across one diagonal of said bridge, said first and second body electrodes being connected across the other diagonal of said bridge whereby current from said source does not flow through said body between said body electrodes; a first transistor of one conductivity, and a second transistor of opposite conductivity, said first transistor having a base, an emitter, and a collector and being connected for common collector operation, said collector being connected to one terminal of said source and said base being connected to one of said points on said body; an output circuit connected between the collector and emitter of said first transistor; and means for eliminating currents through said body due to the currents flowing in the base of said first transistor, said means comprising said second transistor of opposite conductivity, said second transistor having a base, an emitter, and a collector, the base of said first transistor being connected to the base of said second transistor, the emitter of said first transistor being connected to the emitter of said second transistor, and the collector of said second transistor being connected to the other terminal of said source, whereby electrode-generated potentials are reduced and the effect of varying impedances due to direct voltages flowing through said body from said source or from said amplifier are substantially eliminated.

6. In a body voltage detection system for detecting the direct current voltages developed by a living animal body, the combination comprising: first and second electrode connected to first and second points on said body, said first point being connected to a point of reference potential; a source of direct current potential; first and second series-connected resistors of substantially equal impedance connected across said source, the junction of said first and second resistors being connected to said point of reference potential; third and fourth series-connected resistors of substantially equal impedance connected across said source, the junction of said third and fourth resistors being connected to said second electrode whereby said first and second electrodes are effectively connected into a balanced direct current bridge and currents from said source do not flow through said first and second contacts; a first direct current amplifier section for amplifying the varying voltages developed across said first and second electrodes by said living animal body, said amplifier section comprising a first transistor of one conductivity and a second transistor of opposite conductivity, said transistors each having a base, an emitter, and a collector and being connected for common collector operation, the base and collector of said first transistor being connected across said third resistor, and the base and collector of said second transistor being connected across said fourth resistor, said bases being interconnected and said emitters being interconnected, whereby currents from each base flow into the other base; an output circuit for said first amplifier section connected between the collector of said second transistor and the junction of said emitters; fifth and sixth series-connected resistors of substantially equal impedance connected across said source, the junction of said fifth and sixth resistors being connected to said third electrode, whereby said first and third electrodes are effectively connected into a second balanced direct current bridge and current from said source does not flow through said first and third contacts; a second direct current amplifier section for amplifying the varying voltages developed across said first and third electrodes by said living animal body, said second amplifier section comprising a third transistor of said one conductivity and a fourth transistor of opposite conductivity, said third and fourth transistors each having a base, an emitter, and a collector and being connected for common collector operation, the base and collector of said third transistor being connected across said fifth resistor and the base and emitter of said fourth transistor being connected across said sixth resistor, said bases being interconnected and said emitters being interconnected, whereby currents flowing from each base flow into the other base; an output circuit for said second amplifier section connected between the collector of said fourth transistor and the junction of said emitters; and means for combining the outputs of said first and second amplified sections, whereby direct voltages generated by said body may be precisely measured.

7. The invention as defined in claim 6 wherein said first, second, and third electrodes are composed of a nonconducting hydrocarbon material filled with a conducting carbon material.

References Cited in the file of this patent
UNITED STATES PATENTS

| | | |
|---|---|---|
| 2,081,517 | Van Hoffen | May 25, 1937 |
| 2,390,905 | Wening et al. | Dec. 11, 1945 |
| 2,603,753 | Axelsson et al. | July 15, 1952 |
| 2,660,165 | Miller | Nov. 24, 1953 |
| 2,711,399 | Johannsen | June 21, 1955 |
| 2,730,576 | Carruthers | Jan. 10, 1956 |
| 2,782,786 | Krasno | Feb. 26, 1957 |
| 2,848,992 | Pigeon | Aug. 26, 1958 |

FOREIGN PATENTS

| | | |
|---|---|---|
| 787,477 | France | July 8, 1935 |

OTHER REFERENCES

Molyneux article, "Electronic Engineering," March 1957, pp. 125–127. (Copy in 128–2.05.)

Montgomery et al. article, IRE Transactions on Med. Electronics, July 1958, p. 38–40. (Copy in 128–2.05.)

Eziklai article, Electronic Engineering, September 1953, pp. 358–364. (Copy in 179–171–MB.)

UNITED STATES PATENT OFFICE
CERTIFICATE OF CORRECTION

Patent No. 3,029,808

April 17, 1962

Sholly Kagan

It is hereby certified that error appears in the above numbered patent requiring correction and that the said Letters Patent should read as corrected below.

In the grant, lines 2 and 12, and in the heading to the printed specification, line 4, for "Arco Manufacturing Corporation", each occurrence, read -- Avco Manufacturing Corporation --; column 3, line 17, for "Shawinigan" read -- Shawnigan --; column 7, lines 19 and 20, for "electrode" read -- electrodes --.

Signed and sealed this 31st day of July 1962.

(SEAL)
Attest:

ERNEST W. SWIDER
Attesting Officer

DAVID L. LADD
Commissioner of Patents